United States Patent Office 3,019,087
Patented Jan. 30, 1962

3,019,087
PURIFICATION OF SILANE
Theodore A. Jacob and Nelson R. Trenner, Westfield, N.J., assignors to Merck & Co., Inc., Rahway, N.J., a corporation of New Jersey
No Drawing. Filed Sept. 29, 1958, Ser. No. 763,819
2 Claims. (Cl. 23—204)

It is an object of this invention to provide a pure silane compound which can be readily converted to elemental hyper-pure silicon.

It is well known that silicon must be of the highest purity for the most sensitive electronic uses. The presence of even trace amounts of impurities in silicon proves detrimental for semiconductor and transistor requirements.

It is an object of this invention to remove the impurities from the silane before it is converted to silicon and thus avoid the problem of removing the impurities from the end product.

Silane as produced commercially in a gaseous state contains many impurities including diborane, hydrogen, arsines, phosphines, ammonia, hydrogen sulfide and other sulfur containing gases, carbon monoxide and olefinic organic compounds. It is particularly difficult to remove the boron impurities. Boron can not be removed from solid silicon by such known purification processes as zone refining and repeated crystal pulling, because boron is almost equally soluble in molten and solid silicon.

Regarded in certain of its broader aspects, the present invention involves contacting said impure silane with a metal catalyst, whereby said catalyst selectively attacks the impurities leaving the silane in a pure state.

The metal catalysts which may be employed in this reaction include iron, cobalt, palladium, osmium, iridium, copper and silver. The preferred metals exhibiting catalytic utility are Raney nickel and platinum.

The process of the invention may be carried out for the catalytic cracking of silane containing small amounts of impurities which may be present in some grades of silane as a contaminant resulting from the production of the silane. The process may be carried out by cracking the gaseous silane contaminated with the impurities such as diborane in a reactor chamber containing a metal catalyst, at a temperature of from 0° to 100° C. and at a pressure above 50 mm. and advantageously not above 760 mm. of mercury. Pressures above atmospheric pressure may be used but with the disadvantage of using pressure equipment.

It was surprising to find that silane and diborane, or a mixture of these gases, which are normally stable at room temperature, can be cracked at such low temperatures through use of a suitable catalyst. It was also surprising to find that the rate of cracking the diborane and the decomposition of boron on the catalyst is faster than that of silane. The process utilizes these different properties to effect a preferential decomposition of the diborane to purify the silane.

The substantially pure uncontaminated silane can then be decomposed either on a metal catalyst or by a thermal decomposition process to yield substantially pure silicon.

The following examples illustrate the process of the invention using a catalyst and silane contaminated with diborane. The invention is not to be construed as limited thereby in spirit or in scope since it will be apparent to those skilled in the art that many modifications in material and methods may be made without departing from the invention.

EXAMPLE 1

*Cracking diborane in the presence of a platinum catalyst*

Five grams of platinum catalyst was prepared by the hydrogen reduction of platinum oxide. The platinum was charged to a 30 ml. flask and heated to 165° C. under vacuum for 16 hours. Diborane was then added to the flask at 291 mm. of mercury pressure. The gas, after standing 1 hour at room temperature, was analyzed by means of the mass spectrometer and found to consist only of hydrogen. The cracking of the diborane at room temperature on platinum was essentially complete.

EXAMPLE 2

*Preferential cracking of diborane in a mixture of diborane and silane in the presence of a Raney nickel catalyst*

A methanol slurry of Raney nickel (about 2 g., dry) was pumped free of methanol at room temperature. About 20 ml. of a gas mixture at 263 mm. of mercury pressure containing 0.7% of diborane in silane was added to the catalyst at room temperature. The gas, after standing for one hour, was analyzed by means of the mass spectrometer. The analysis showed that 80–90% of the diborane had cracked on the nickel catalyst.

After the diborane has been reduced by cracking to a very low amount, the purified silane may be passed into another reactor chamber and thermally decomposed in the presence of a catalyst.

EXAMPLE 3

*Preferential cracking of diborane in a mixture of diborane and silane in the presence of a platinum catalyst*

A platinum catalyst was prepared by treating platinum dioxide with hydrogen and heating the reduced catalyst at 125° C. under vacuum to remove the water formed. Three grams of this catalyst was charged to a 1.0 liter flask followed by a gas mixture containing 6.8% diborane and 93.2% silane at a total pressure of 144 mm. mercury pressure and a temperature of −75° C. The temperature was allowed to rise slowly as samples of the gas were taken for analysis. The diborane gradually decomposed on the catalyst but the silane was essentially unchanged. After a total of 21 hours and a final temperature of 25° C., 74% of the diborane had decomposed, whereas only 4% of the silane had decomposed. Thus, this catalyst showed a marked specificity for the decomposition of diborane in the presence of silane.

Various changes and modifications may be made in the present invention, certain preferred embodiments of which are herein disclosed without departing from the scope thereof; to the extent that these changes and modifications are within the scope of the appended claims, they are to be considered a part of this invention.

What is claimed is:

1. The process for the purification of silane contaminated with diborane which comprises contacting the contaminated silane with a metal catalyst selected from the group consisting of platinum and Raney nickel, in a reactor chamber and decomposing most of the diborane without decomposing any appreciable amount of the silane.

2. The process for the catalytic cracking of diborane which comprises contacting diborane with a metal catalyst selected from the group consisting of platinum and Raney nickel and at a temperature of from 0° to 100° C. and at a pressure above 50 mm. of mercury to form boron.

References Cited in the file of this patent

UNITED STATES PATENTS 2,528,454    Schlesinger et al. _____ Oct. 31, 1950

FOREIGN PATENTS 745,698    Great Britain _____ Feb. 29, 1956

OTHER REFERENCES

Taylor: "Industrial Hydrogen," 1921, p. 190.
Beachell et al.: "Journal of Physical Chemistry," vol. 60, pages 307–308 (Mar. 1956).